United States Patent
Aoki et al.

(10) Patent No.: US 9,430,580 B2
(45) Date of Patent: Aug. 30, 2016

(54) INFORMATION PROCESSING APPARATUS, INFORMATION PROCESSING METHOD, AND PROGRAM FOR DISPLAYING SWITCHING INFORMATION

(75) Inventors: Yuya Aoki, Tokyo (JP); Tsuyoshi Ishikawa, Kanagawa (JP); Mitsuru Nishibe, Tokyo (JP); Takahiro Okayama, Tokyo (JP); Shunichi Kasahara, Kanagawa (JP)

(73) Assignee: Sony Corporation, Tokyo (JP)

(*) Notice: Subject to any disclaimer, the term of this patent is extended or adjusted under 35 U.S.C. 154(b) by 119 days.

(21) Appl. No.: 13/469,821

(22) Filed: May 11, 2012

(65) Prior Publication Data

US 2013/0014013 A1 Jan. 10, 2013

(30) Foreign Application Priority Data

May 19, 2011 (JP) .................................. 2011-112344

(51) Int. Cl.
*G06F 17/30* (2006.01)

(52) U.S. Cl.
CPC ... *G06F 17/30899* (2013.01); *G06F 17/30861* (2013.01); *G06F 17/30864* (2013.01)

(58) Field of Classification Search
CPC .............. G06F 17/211; G06F 3/0481; G06F 17/30861; G06F 17/30864; G06F 17/30867; G06F 17/30905; G06F 17/30014; G06F 17/30274; H04L 67/02; H04L 63/10; G09G 2370/027; G09G 3/003; G09G 2340/14

USPC ......................................................... 715/716
See application file for complete search history.

(56) References Cited

U.S. PATENT DOCUMENTS

| | | | |
|---|---|---|---|
| 5,953,010 A * | 9/1999 | Kampe et al. ................. 715/772 |
| 6,173,445 B1 * | 1/2001 | Robins et al. ................. 717/173 |
| 6,934,707 B1 * | 8/2005 | Berstis et al. | |
| 7,002,583 B2 * | 2/2006 | Rabb, III ....................... 345/473 |
| 2002/0052925 A1 * | 5/2002 | Kim et al. ..................... 709/217 |
| 2009/0106447 A1 * | 4/2009 | Lection .......................... 709/236 |
| 2009/0119595 A1 * | 5/2009 | Morris et al. ................. 715/730 |
| 2010/0309147 A1 * | 12/2010 | Fleizach et al. .............. 345/173 |
| 2012/0272166 A1 * | 10/2012 | Alkov et al. .................. 715/760 |
| 2013/0121503 A1 * | 5/2013 | Ankolekar ............. H04W 4/02 381/77 |

FOREIGN PATENT DOCUMENTS

JP 2010-92103 4/2010

* cited by examiner

*Primary Examiner* — Nicholas Ulrich
(74) *Attorney, Agent, or Firm* — Chip Law Group

(57) ABSTRACT

There is provided an information processing apparatus including a page switching unit for switching a display screen from a first Web page screen displayed on a display unit to a second Web page screen, and a switching information notification unit for notifying a page switching information on a notification screen before the second Web page screen is displayed while switching between the pages by the page switching unit, the page switching information is based on information included in at least the second Web page of the first and second Web pages, and the notification screen is a different screen from the first Web page.

15 Claims, 15 Drawing Sheets

SCREEN S1

NOTIFICATION SCREEN S3

SCREEN S2

NOTIFICATION SCREEN S3

FIG.7
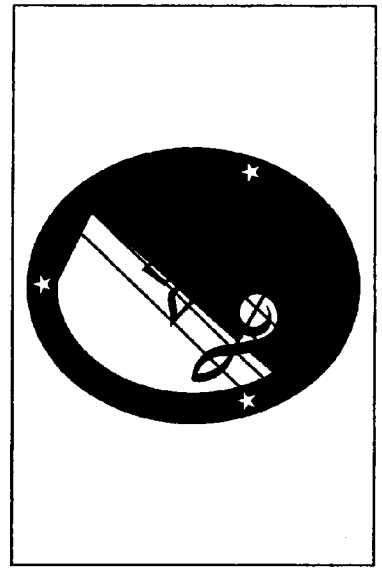
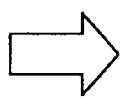
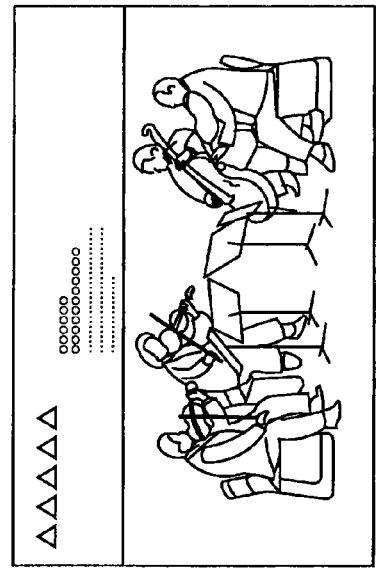
SCREEN S1 → NOTIFICATION SCREEN S3 → SCREEN S2

INFORMATION PROCESSING APPARATUS, INFORMATION PROCESSING METHOD, AND PROGRAM FOR DISPLAYING SWITCHING INFORMATION

BACKGROUND

The present disclosure relates to an information processing apparatus, an information processing method, and a program.

In recent years, with the spread of the Internet and improvement of hardware technology, information terminal devices such as a personal computer or mobile phone have been used by many users. This type of information terminal device is provided with a Web browser to navigate Web pages and the navigation of Web pages using a Web browser become increasingly popular (see Japanese Patent Application Laid-Open Publication No. 2010-092103).

SUMMARY

Web pages are linked with one another through a link and are transitioned (switched) by means of an operation such as clicking a mouse button and so on. However, the transition of Web pages is a time-consuming process and the way a user easily perceives a transition state of Web pages has not yet been realized.

In view of the forgoing, it is desirable to provide a novel and improved information processing apparatus which is capable of easily perceiving a transition state of Web pages while switching between Web pages.

According to an embodiment of the present disclosure, there is provided an information processing apparatus including a page switching unit for switching a display screen from a first Web page screen displayed on a display unit to a second Web page screen, and a switching information notification unit for notifying a page switching information on a notification screen before the second Web page screen is displayed while a switching between the pages is performed by the page switching unit, the page switching information is based on information included in at least the second Web page of the first and second Web pages, and the notification screen is a different screen from the first Web page.

According to another embodiment of the present disclosure, there is provided an information processing method including switching a display screen from a first Web page screen displayed on a display unit to a second Web page screen, and notifying a page switching information on a notification screen before the second Web page screen is displayed while switching between the Web pages, the page switching information is based on information included in at least the second Web page of the first and second Web pages, and the notification screen is a different screen from the first Web page.

According to another embodiment of the present disclosure, there is provided a program for causing a computer to execute a process, the process includes switching a display screen from a first Web page screen displayed on a display unit to a second Web page screen, and notifying a page switching information on a notification screen before the second Web page screen is displayed while switching between the Web pages, the page switching information is based on information included in at least the second Web page of the first and second Web pages, and the notification screen is a different screen from the first Web page.

As described above, according to the present disclosure, it is possible to easily perceive a transition state of Web pages while switching between Web pages.

BRIEF DESCRIPTION OF THE DRAWINGS

FIG. 7 is a diagram explaining an animation display example 3.

DETAILED DESCRIPTION OF THE EMBODIMENT(S)

Figure 1:
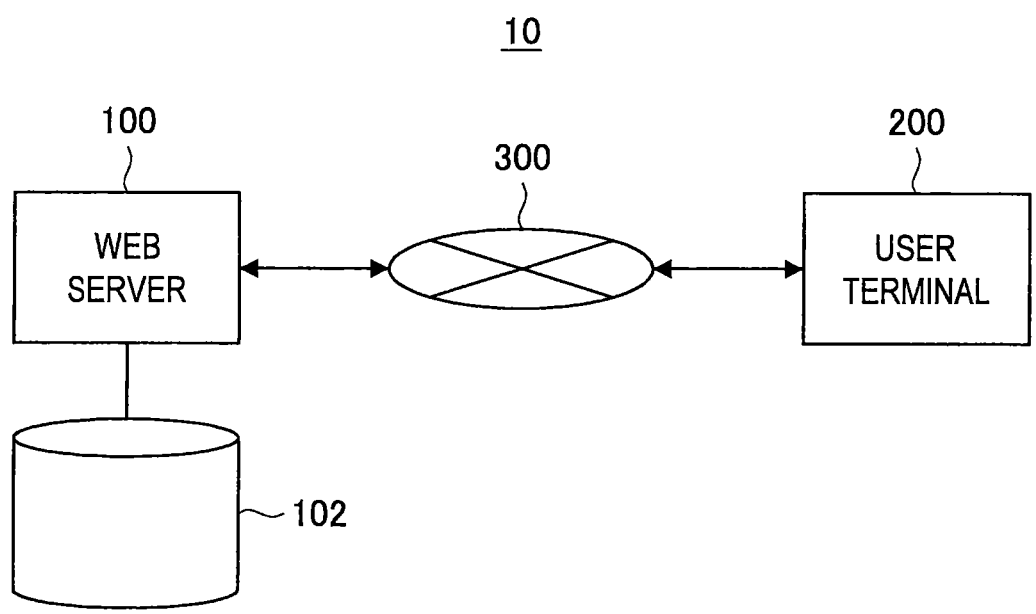
FIG. 1 is a diagram showing a configuration of a Web page display system.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. Configuration of Web Page Display System
2. Detailed Configuration of User Terminal
3. Animation Display while Switching between Web Pages
3-1. Flow of Animation Creation
3-2. Animation Display Examples while Switching between Web Pages
4. Process of Animation Display while Switching between Web Pages
5. Page Switching in Web Page Group of Tree Structure
6. Conclusion

1. CONFIGURATION OF WEB PAGE DISPLAY SYSTEM

Referring to FIG. 1, a configuration of a Web page display system 10 according to the present embodiment will be described. FIG. 1 is a diagram illustrating the configuration of the Web page display system 10.

As shown in FIG. 1, the Web page display system 10 includes a Web server 100, a user terminal 200, and a network 300. The user terminal 200 is an example of an information processing apparatus. The user terminal 200 and the Web server 100 can communicate with each other via the network 300. In addition, the FIG. 1 illustrates only one user terminal, but the number of the user terminal is not limited to one and may be two or more.

The Web server 100 manages Web pages to be displayed on the user terminal 200. The Web server 100 transmits Web pages to the user terminal 200 via the network in response to a request from the user terminal 200. The Web server 100 is connected with a storage unit 102 which may be an external storage such as a hard disk. The storage unit 102 stores data such as content data contained in Web pages.

Web pages may be a document described in the form of a HyperText Markup Language (HTML) and a text data. Further, the Web pages are linked with each other via a link and switched by user operation.

The user terminal 200 is an electronic device which is used by a user, such as a personal computer, a mobile phone, a Personal Digital Assistant (PDA), and a television receiver. The user terminal 200 is provided with a Web browser for viewing Web pages.

The user terminal 200 acquires Web pages from the Web server 100 and displays the acquired Web pages on a display unit using a Web browser. In addition, the user terminal 200 switches a display from a Web page (also referred to as "first Web page") screen displayed on the display unit to a Web page (also referred to as "second Web page") screen which is to be a link destination of the first Web page, in response to a screen switching operation by a user.

In this example, the user terminal 200 notifies its user of page switching information (e.g., animation information) by displaying the page switching information on a notification screen (e.g., displaying an animation on the notification screen) different from the first and second Web page screens before the second Web page is displayed while switching Web pages, as will be discussed further later. The page switching information is based on information included in at least the second Web page of the first and second Web pages. This allows a user to easily perceive the page transition state by watching the page switching information notified on the notification screen while switching between Web pages. In addition, the detailed configuration of the user terminal 200 will be described later.

The network 300 includes wireless or wired link of information transmitted from the Web server 100 and the user terminal 200 which are connected with the network 300. For example, the network 300 may include public communication networks such as the Internet, telephone circuit networks, and satellite communication networks, a variety of LAN (Local Area Network) and WAN (Wide Area Network) including Ethernet (registered trademark).

2. DETAILED CONFIGURATION OF USER TERMINAL

Figure 2:
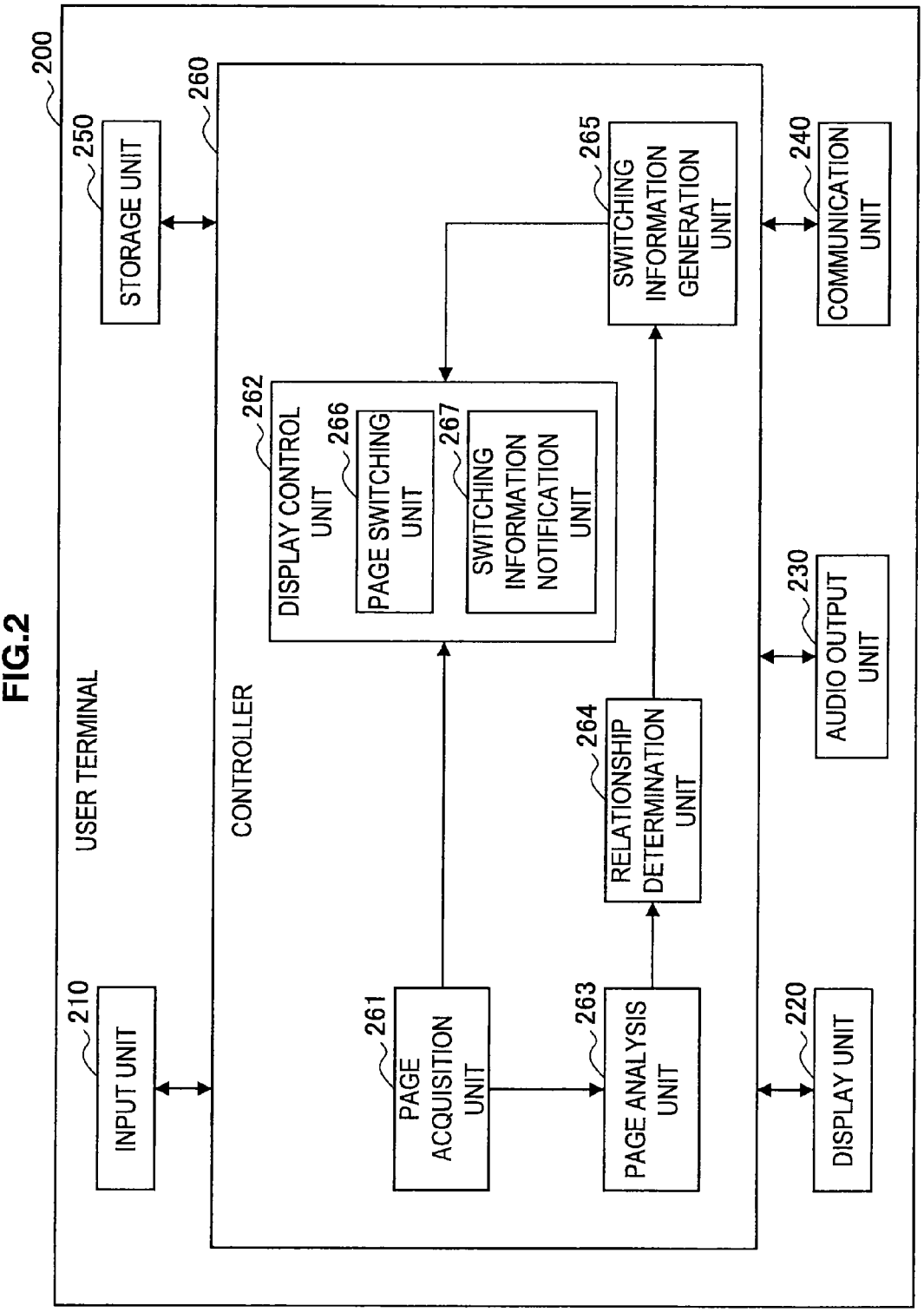
FIG. 2 is a diagram showing a detailed configuration of a user terminal.

While referring to FIG. 2, the detailed configuration of the user terminal 200 will be described. FIG. 2 is a diagram showing the detailed configuration of the user terminal 200.

As shown in FIG. 2, the user terminal 200 includes an input unit 210, a display unit 220, an audio output unit 230, a communication unit 240, a storage unit 250, and a controller 260.

The input unit 210 is configured to receive an input of operation information from a user. The input unit 210 provides the operation information received from the user to the controller 260. For example, the input unit 210 may include an input device such as a mouse, a keyboard, and a touch panel. In this embodiment, the input unit 210 can receive a flick operation, a pinch-in operation or a pinch-out operation performed by a user on a touch panel overlapped on the display unit 220.

The display unit 220 is configured to display a variety of information under control of the controller 260. The display unit 220 displays a screen of the Web page acquired from the Web server. For example, the display unit 220 displays a moving image such as an animation on the notification screen while switching between Web pages. The display unit 220 may configured to include a display device such as a liquid crystal display.

The audio output unit 230 is configured to output audio under control of the controller 260. For example, the audio output unit 230 can output information relevant to Web page switching as audio when an animation is displaying on the notification screen while switching between Web pages. The audio output unit 230 may be configured to include an audio output device such as a speaker.

The communication unit 240 is configured to communicate with the Web server 100 under control of the controller 260. For example, the communication unit 240 may be configured to include a communication device and thus it can function as a transmitter and a receiver. The communication unit 240 may receive Web pages from the Web server 100.

The storage unit 250 is configured to store a variety of information which is used by the controller 260. For example, the storage unit 250 may be configured to include a storage device such as a magnetic storage device. Animation information (moving image information) to be displayed on the notification screen while switching between Web pages may be pre-stored in the storage unit 250.

The controller 260 is configured to control an overall operation of the user terminal 200. For example, the controller 260 can control an operation of the user terminal 200 based on operation information provided from the input unit 210, information received by the communication unit 240, and so on. The controller 260 may be configured, for example, to include a CPU, a ROM, and a RAM.

As shown in FIG. 2, the controller 260 includes a page acquisition unit 261, a display control unit 262, a page analysis unit 263, a relationship determination unit 264, a switching information generation unit 265, a page switching unit 266, and a switching information notification unit 267. Further, in this embodiment, the page analysis unit 263 corresponds to an analysis unit, the relationship determination unit 264 corresponds to a determination unit, and the switching information generation unit 265 corresponds to a generation unit.

The page acquisition unit 261 acquires Web pages from the Web server 100 via the communication unit 240. For example, when there is an operation of switching from a first Web page to a second Web page while displaying the first Web page on the display unit 220, the page acquisition unit 261 acquires the second Web page from the Web server. The second Web page is to be a link destination of the first Web page. In this case, it takes a substantial time to complete the acquisition of the second Web page.

The display control unit 262 controls the display unit 220 to display a Web page acquired by the page acquisition unit 261. The Web page is displayed using a Web browser. The display control unit 262 is configured to include the page switching unit 266 for switching between Web page screens. The page switching unit 266 switches a display screen from a display screen of the first Web page (a first Web page screen) displayed on the display unit 220 to a display screen of the second Web page (a second Web page screen) when a page switching begins to be performed by user.

The page analysis unit 263 analyzes the Web page acquired by the page acquisition unit 261. The page analysis unit 263 analyzes the first Web page and the second Web page to be switched while switching between the Web pages. For example, the page analysis unit 263 may analyze Uniform Resource Locator (URL) information, IP address information, meta information, and title information of the first and second Web pages. The page analysis unit 263 may analyze content data of the Web pages.

The relationship determination unit 264 determines the relationship of the first Web page and the second Web page based on a result analyzed by the page analysis unit 263. For example, if the first Web page and the second Web page are both related to music, then the relationship determination unit 264 determines that the two Web pages are relevant to each other because the two Web pages have common genre (music). In addition, if the first Web page is a top page of a search engine, the second Web page is a link destination of the top page, and the two Web pages belong to a common category (e.g., a page such as sports or weather forecast), then the relationship determination unit 264 determines that the two Web pages are pages of a top-down hierarchy (a tree structure described later) and are relevant to each other. Furthermore, when the first Web page is related to music and the second Web page is related to a sport which has registered in a bookmark in advance, the relationship determination unit 264 determines that the two Web pages have different genres and have no relationship to each other.

The switching information generation unit 265 generates page switching information to be displayed on the notification screen while switching between Web pages based on a result determined by the relationship determination unit 264. In this example, it is assumed that the page switching information is animation information (moving image information).

When the relationship determination unit 264 determines that the first Web page and the second Web page have a relationship to each other, the switching information generation unit 265 generates animation information based on information indicating the relationship of the first Web page and the second Web page. For example, when the first Web page and the second Web page are pages of a common genre (e.g., sports of tennis), the switching information generation unit 265 generates animation information indicating the common genre (e.g., an animation representing the movement of a tennis ball).

When the relationship determination unit 264 determines that the first Web page and the second Web page have no relationship to each other, the switching information generation unit 265 generates animation information based on only the second Web page. For example, when the first Web page and the second Web page have different genres, the switching information generation unit 265 generates animation information based on the genre information of the second Web page.

In this way, the switching information generation unit 265 generates animation information which is based on information included in at least the second Web page of the first and second Web pages in response to a result determined by the relationship determination unit 264. Thus, it is possible to generate optimal animation information depending on the degree of relevance between two Web pages.

The switching information generation unit 265 may generate animation information based on at least one of URL information, IP address information, meta information, and title information of the second Web page. For example, because geographical information of a Web page may be derived from URL information or IP address information, the switching information generation unit 265 can create an animation corresponding to the geographical information. Also, it is possible to figure out the intention of a Web site designer by a keyword included in meta information, and thus the switching information generation unit 265 can create an animation corresponding to the keyword. In addition, a summary of the Web page may be derived from title information, and thus the switching information generation unit 265 can create an animation which may be associated from the title. Furthermore, the switching information generation unit 265 create an animation relevant to finance from a keyword (e.g., finance) of a portion of URL information.

In this way, it is not necessary to analyze content data of the second Web page because the animation information is generated based on information such as URL information of the second Web page. Thus, while switching between Web pages, it is possible to generate animation information in a short period of time.

The switching information generation unit 265, for example, generates page switching information while Web pages are switched by the display control unit 262. Thus, it is possible to generate animation information which is appropriately corresponding to at least the second Web page of the first and second Web pages in a real time fashion.

The switching information generation unit 265 selects animation information relevant to at least the second Web page of a plurality of animation information stored in the storage unit 250. In such a case, it is not necessary to create new animation information while switching between Web pages because the pre-created animation information is used, thereby reducing the processing load of the controller 260.

The switching information notification unit 267 notifies the page switching information by displaying it on the notification screen, before the second Web page screen is displayed by the page switching unit 266 while switching between Web pages. In this regard, the notification screen is a different screen from the first and second Web page screens and it is a screen across the entire display area of the display unit 220. The page switching information is notified by the notification screen, and thus a user can perceive the content of the contents contained in the second Web page which is a link destination and the user can perceive that the transition to the second Web page is progressing.

The switching information notification unit 267 may display the page switching information on the notification screen by means of an animation (moving image). Because animations involve motion information, the animations become audiovisual information which is easy to understand for a user. Thus, the user can more properly perceive the transition state of the Web pages while switching between Web pages.

The switching information notification unit 267 changes an animation on the notification screen depending on the progress of switching from the first Web page to the second Web page. This allows a user to more properly understand the transition state of the Web pages.

The switching information notification unit 267 displays page switching information on the notification screen and causes the audio output unit 230 to output the page switching information. In this case, a user can recognize audible information relevant to the page switching and visual image information displayed on the display screen. Thus, a user can more properly perceive the transition state of the Web pages.

3. ANIMATION DISPLAY WHILE SWITCHING BETWEEN WEB PAGES

As described above, the user terminal 200 according to the present embodiment displays an animation as page switching information on the notification screen before the second Web page screen is displayed while switching between Web pages. A detailed flow of animation creation and a detailed display example of an animation will be described.

(3-1. Flow of Animation Creation)

Figure 3:
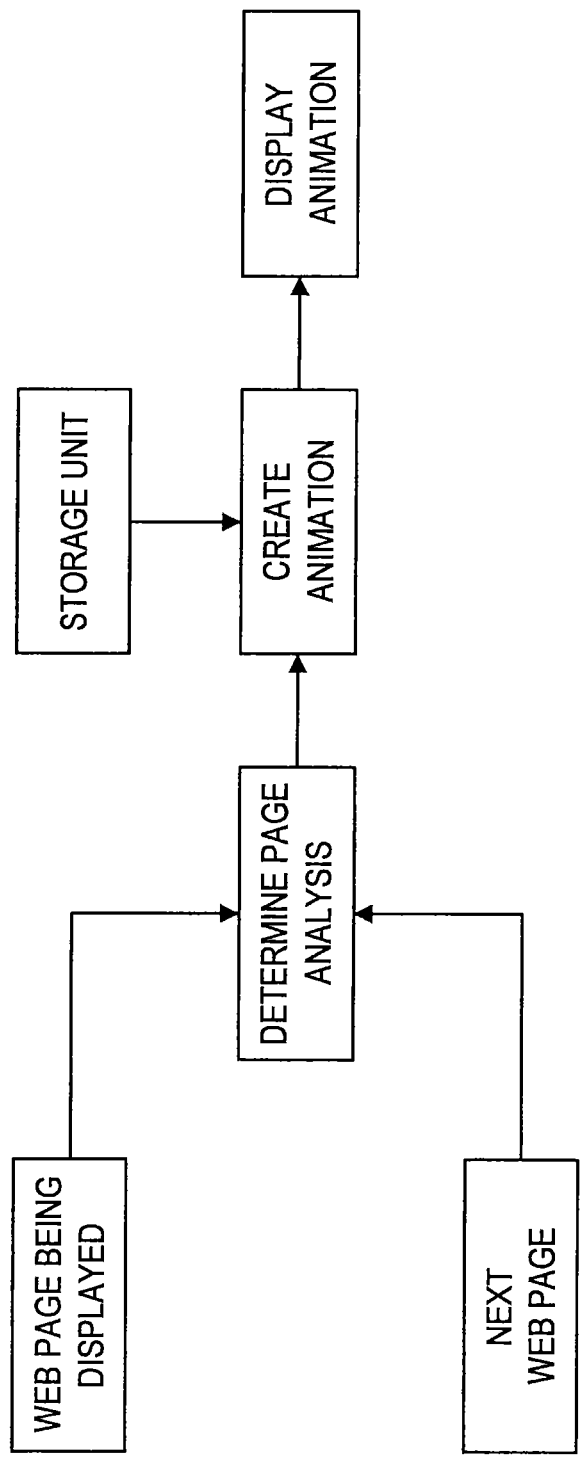
FIG. 3 is a diagram showing a flow of an animation creation.

Referring to FIG. 3, a flow of animation creation will be described. FIG. 3 is a diagram illustrating a flow of animation creation.

As shown in FIG. 3, page analysis is performed on a Web page (a first Web page) being displayed on the display unit 220 and a next Web page (a second Web page) which is a destination to be switched. It is determined whether or not the Web page being displayed and the next Web page have a relationship based on a result of the page analysis.

Next, an animation is created based on the relationship between the Web page being displayed and the next Web page. The animation is created by producing a new animation in real time while switching between Web pages or by selecting a corresponding animation of the animations pre-stored in the storage unit 250.

The animation, which is created in this way, is displayed on a notification screen switched from the display screen of the Web page being displayed. And then, a next Web page may be displayed by switching the display screen after the display of the animation on the notification screen is completed.

(3-2. Specific Examples of Animation Display)

Referring to FIG. 4 to FIG. 11, specific examples of an animation displayed on a notification screen while switching between Web pages will be described.

Animation Display Example 1

Figure 4:
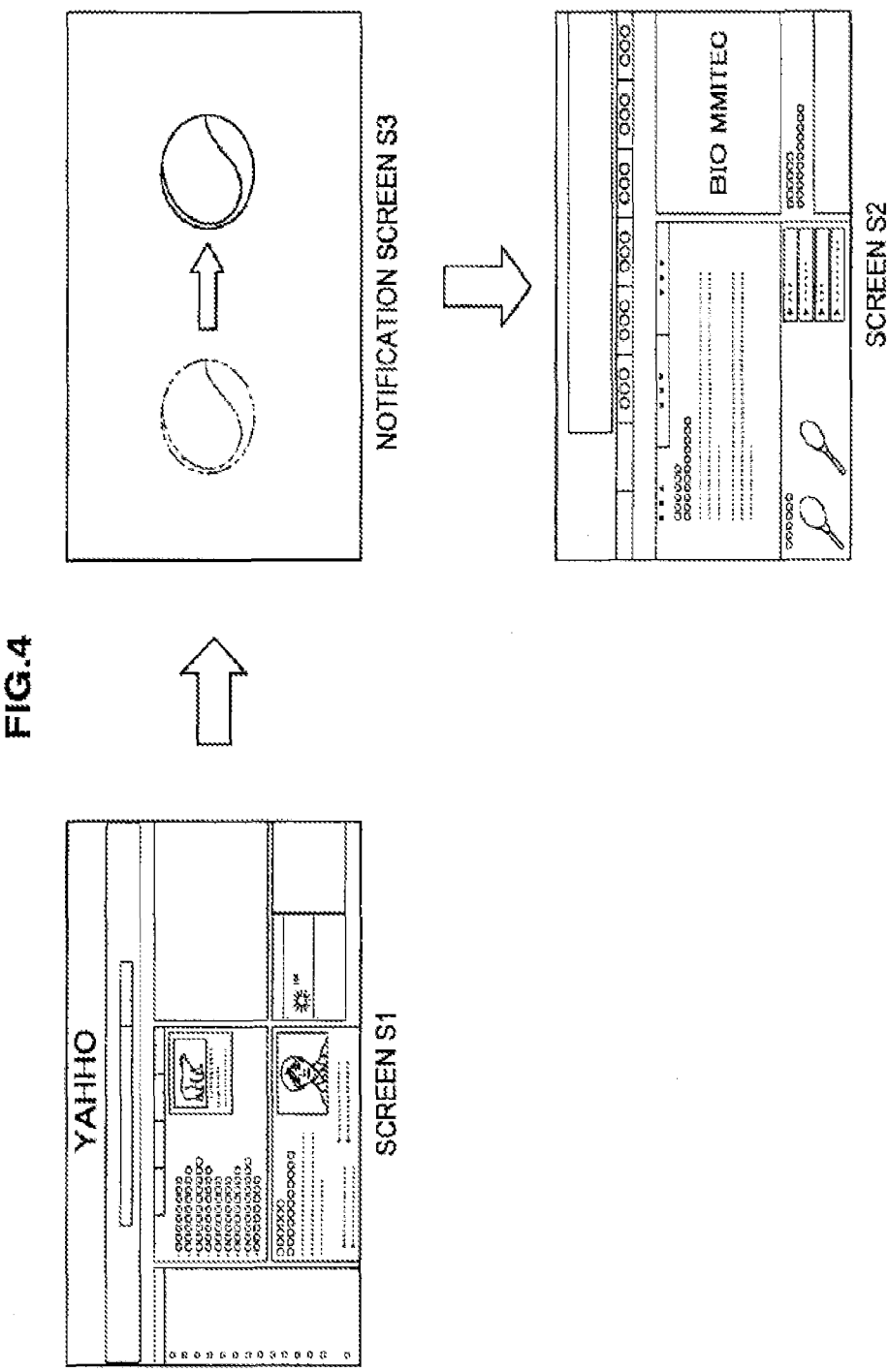
FIG. 4 is a diagram explaining an animation display example 1.

FIG. 4 is a diagram explaining an animation display example 1. This animation display example 1 represents an animation which is displayed on a notification screen S3 while a display screen is switched from a Web page screen (first Web page screen) S1 of a search engine to a Web page screen (second Web page screen) S2 of a tennis site.

The notification screen S3 of FIG. 4, for example, display an animation in which a tennis ball relevant to the content of the second Web page is moving from left to right of the screen. Further, the notification screen S3 is a screen across the entire display area of the display unit 220. Moreover, the color of the tennis ball may be darker according to the process of acquiring the second Web page from the Web server 100. In other words, as the switching of Web pages is progressed, the animation may be changed accordingly. In this way, a user can visually recognize a genre of the second Web page and a transition state toward the second Web page.

Animation Display Example 2

Figure 5:
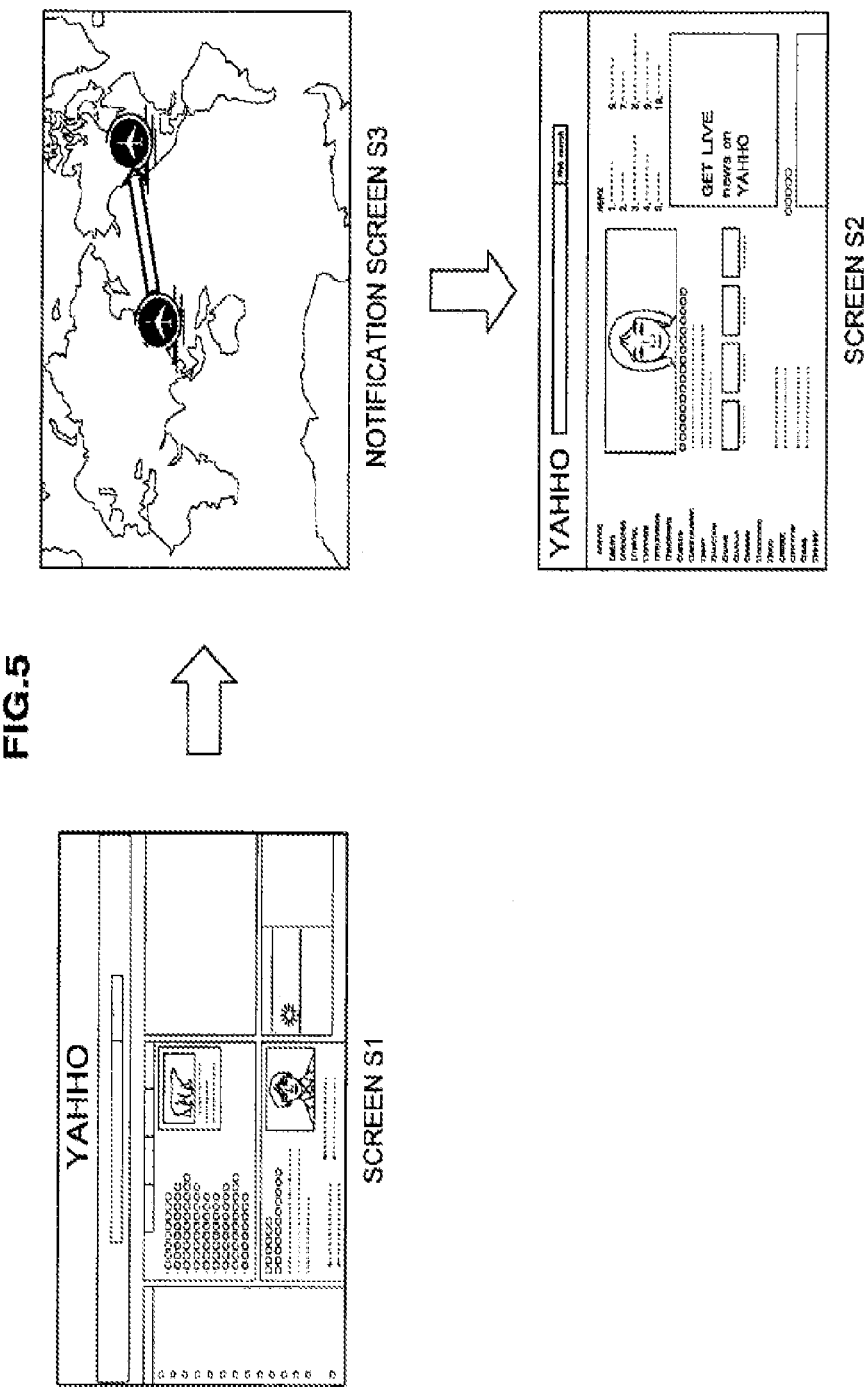
FIG. 5 is a diagram explaining an animation display example 2.

FIG. 5 is a diagram explaining an animation display example 2. This animation display example 2 represents an animation which is displayed on a notification screen S3 while a display screen is switched from a first Web page screen S1 of a Japanese search engine to a second Web page screen S2 of an English search engine. Whether the search engine is a Japanese search engine or an English search engine can be determined by analyzing URL information of the Web pages.

Figure 6:
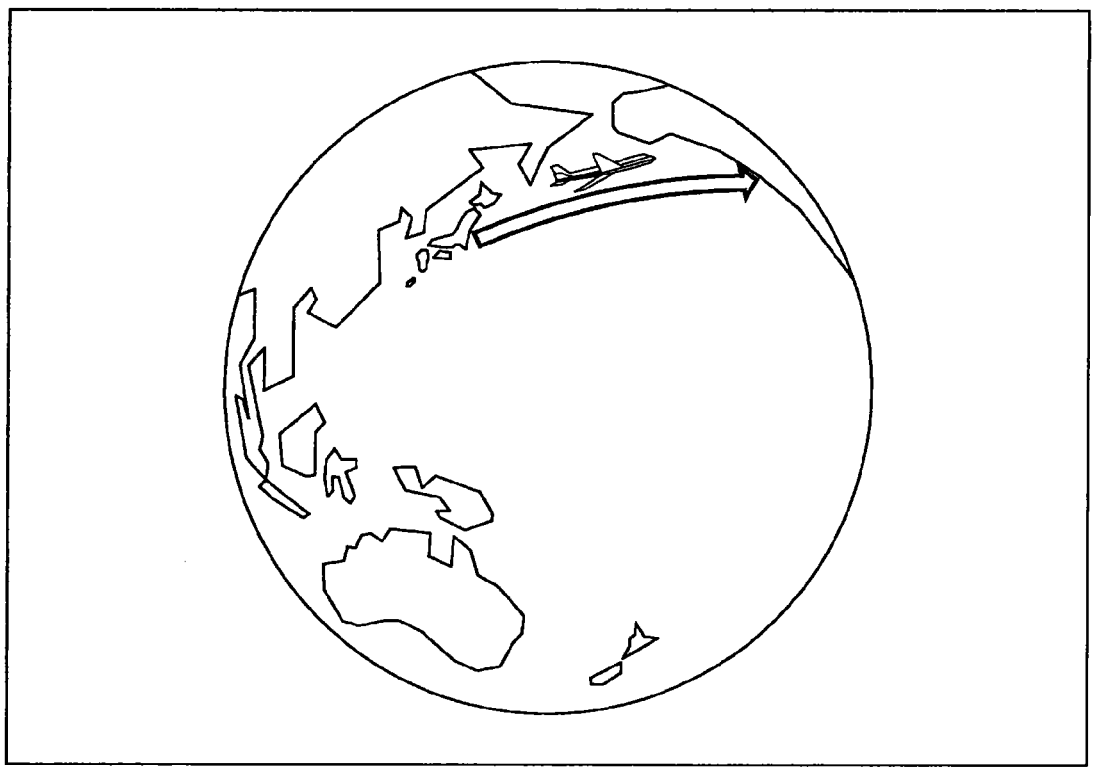
FIG. 6 illustrates an animation displayed on a notification screen.

In the notification screen S3 of FIG. 5, for example, the displayed animation represents that a mark indicating an airplane is moving from Japan to America on the map in proportion to the transition state of the pages. Thus, a user can expect that the search engine will be changed from the Japanese search engine to the America search engine. In addition, as an animation to be displayed on the notification screen S3, it is possible to display an animation showing an airplane moving on a three-dimensional map, as illustrated in FIG. 6 instead of FIG. 5. FIG. 6 illustrates an animation displayed on the notification screen S3.

Animation Display Example 3

FIG. 7 is a diagram explaining an animation display example 3. This animation display example 3 represents an animation which is displayed on a notification screen S3 while a display screen is switched from a first Web page screen S1 of a music site being displayed to a second Web page screen S2 of another music site.

In the notification screen S3 of FIG. 7, for example, the displayed animation represents that an item (e.g., a music note) related to music is appeared on the screen in proportion to the transition state of the pages. Thus, a user can visually recognize that the second Web page is a site relevant to music and also can recognize a transition state toward the second Web pages.

Animation Display Example 4

Figure 8:
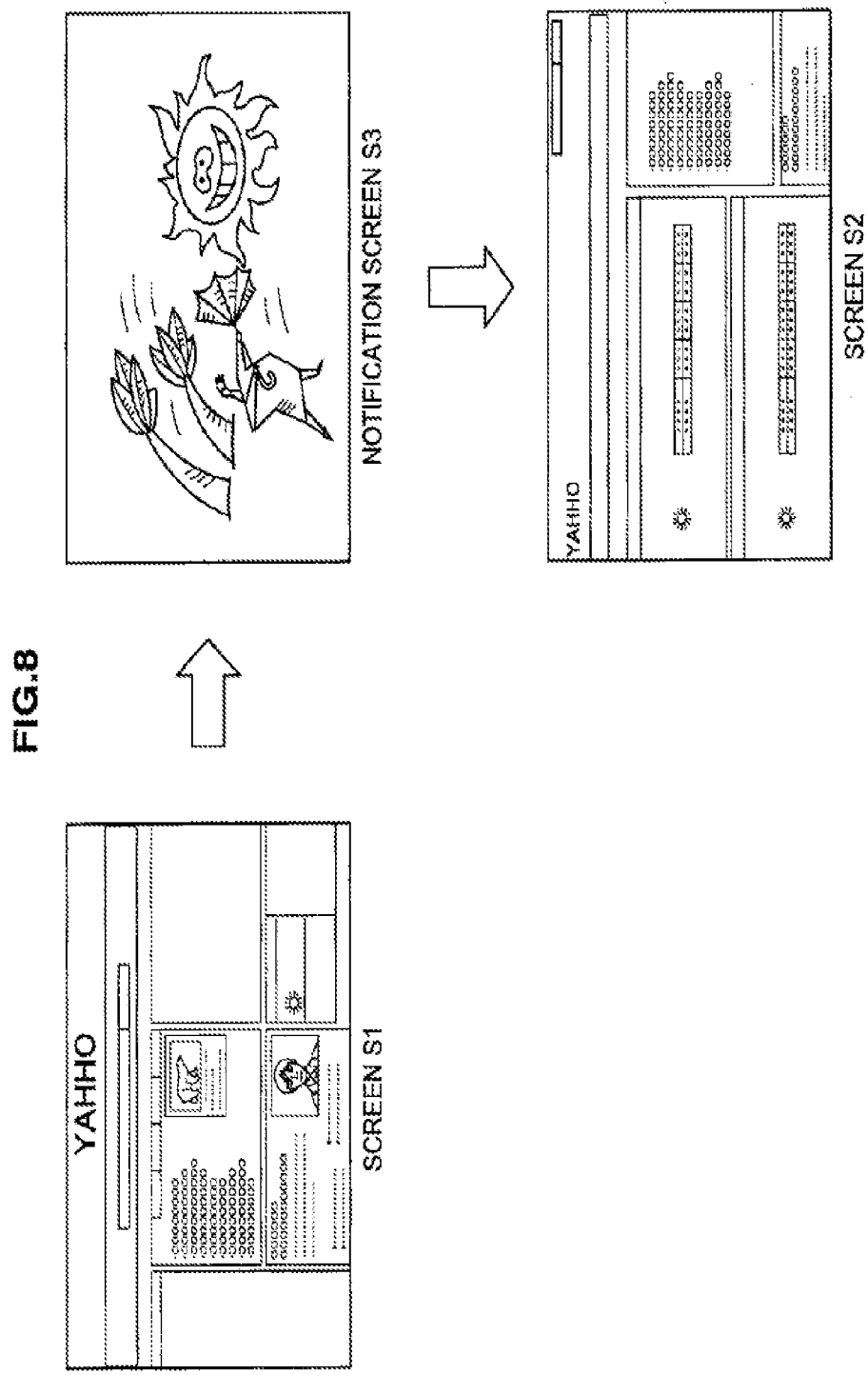
FIG. 8 is a diagram explaining an animation display example 4.

FIG. 8 is a diagram explaining an animation display example 4. This animation display example 4 represents an animation displayed on a notification screen S3 while a display screen is switched from a first Web page screen S1 of a search engine to a second Web page screen S2 of a weather forecast site.

In the notification screen S3 of FIG. 8, for example, if a weather forecast of a weather forecast site predicts sunshine, then an animation indicating a sun is displayed. If a weather forecast of a weather forecast site predicts rain, then an animation indicating a rain is displayed. Thus a user can recognize that the second Web page is a weather forecast site and also can recognize a weather forecast while switching between Web pages. Furthermore, the user can visually recognize a transition state of the second Web page by displaying an animation depending on the acquisition conditions of the second Web page.

Animation Display Example 5

Figure 9:
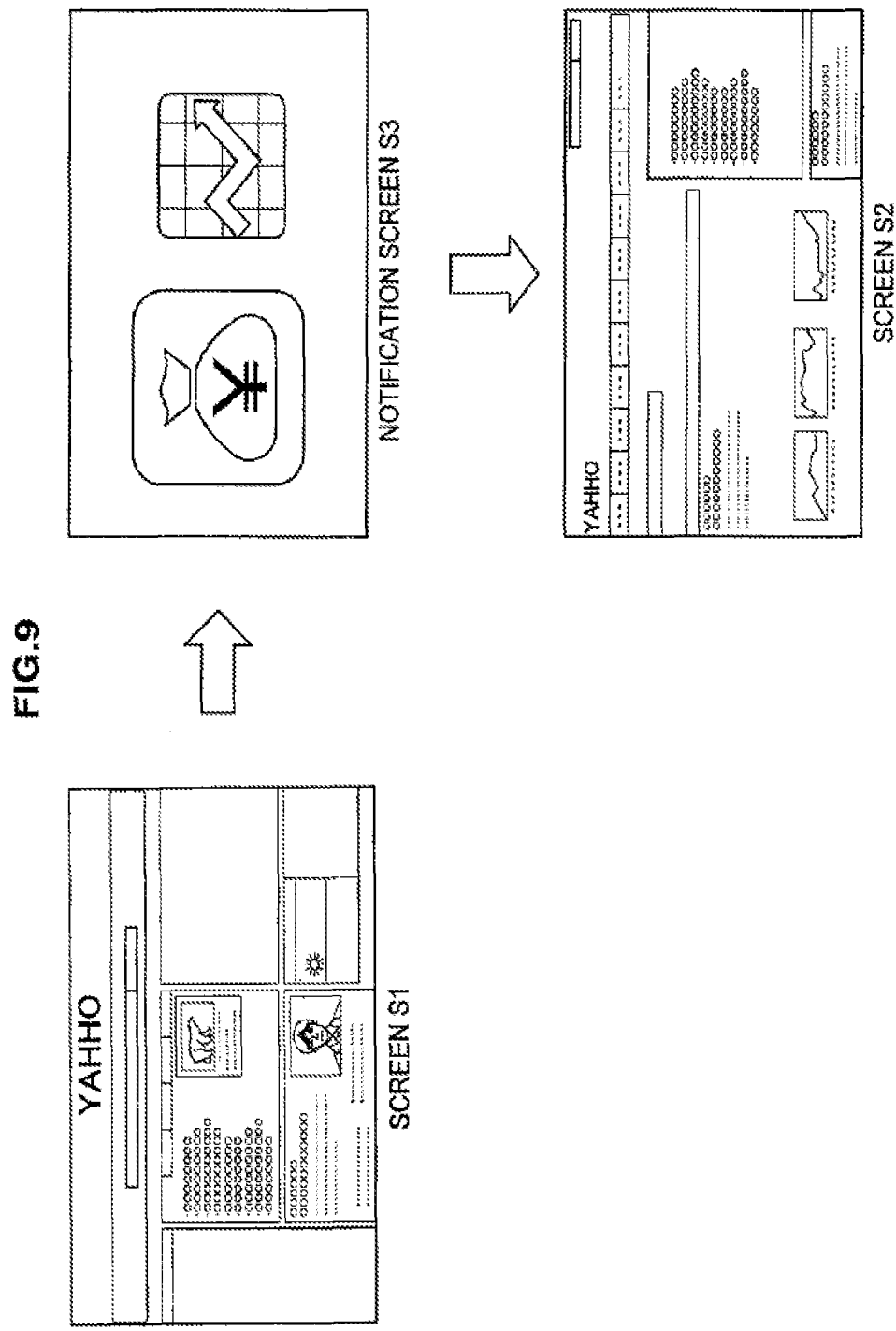
FIG. 9 is a diagram explaining an animation display example 5.

FIG. 9 is a diagram explaining an animation display example 5. This animation display example 5 represents an animation which is displayed on a notification screen S3 while a display screen is switched from a first Web page screen S1 of a search engine to a second Web page screen S2 of a finance site.

In the notification screen S3 of FIG. 9, the displayed animation is related to finance. For example, if a stock price is rising, then an animation indicating the upward trend of a graph is displayed. Thus, a user can recognize that the second Web page is a finance site and also can recognize a stock price condition (rising of stock price) while switching between Web pages.

Animation Display Example 6

Figure 10:
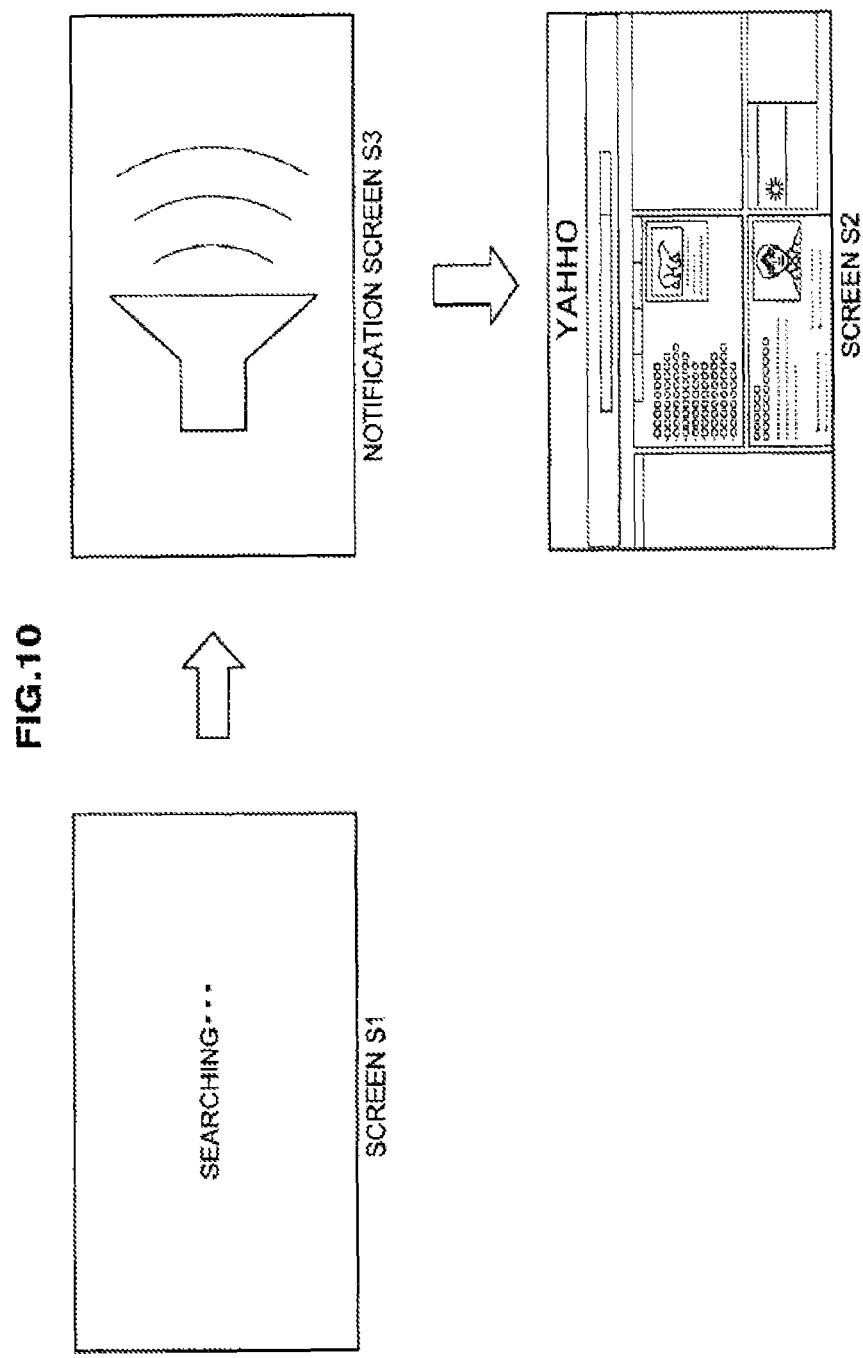
FIG. 10 is a diagram explaining an animation display example 6.

FIG. 10 is a diagram explaining an animation display example 6. This animation display example 6 represents an animation which is displayed on a notification screen S3 while a display screen is switched from a first Web page screen S1 in which a search is performing in one Web page to a second Web page screen S2 of a search engine which is registered in a bookmark.

In FIG. 10, when the second Web page has registered in a bookmark, an animation indicating a mark indicating a speaker is displayed on the notification screen S3 and also a specific audio is output from the audio output unit 230. Thus, because not only the visual information using a display screen but also the audible information using a sound is output, a user can recognize that the second Web page has registered in a bookmark and also can recognize the transition state of the second Web page while switching between Web pages.

Animation Display Example 7

Figure 11:
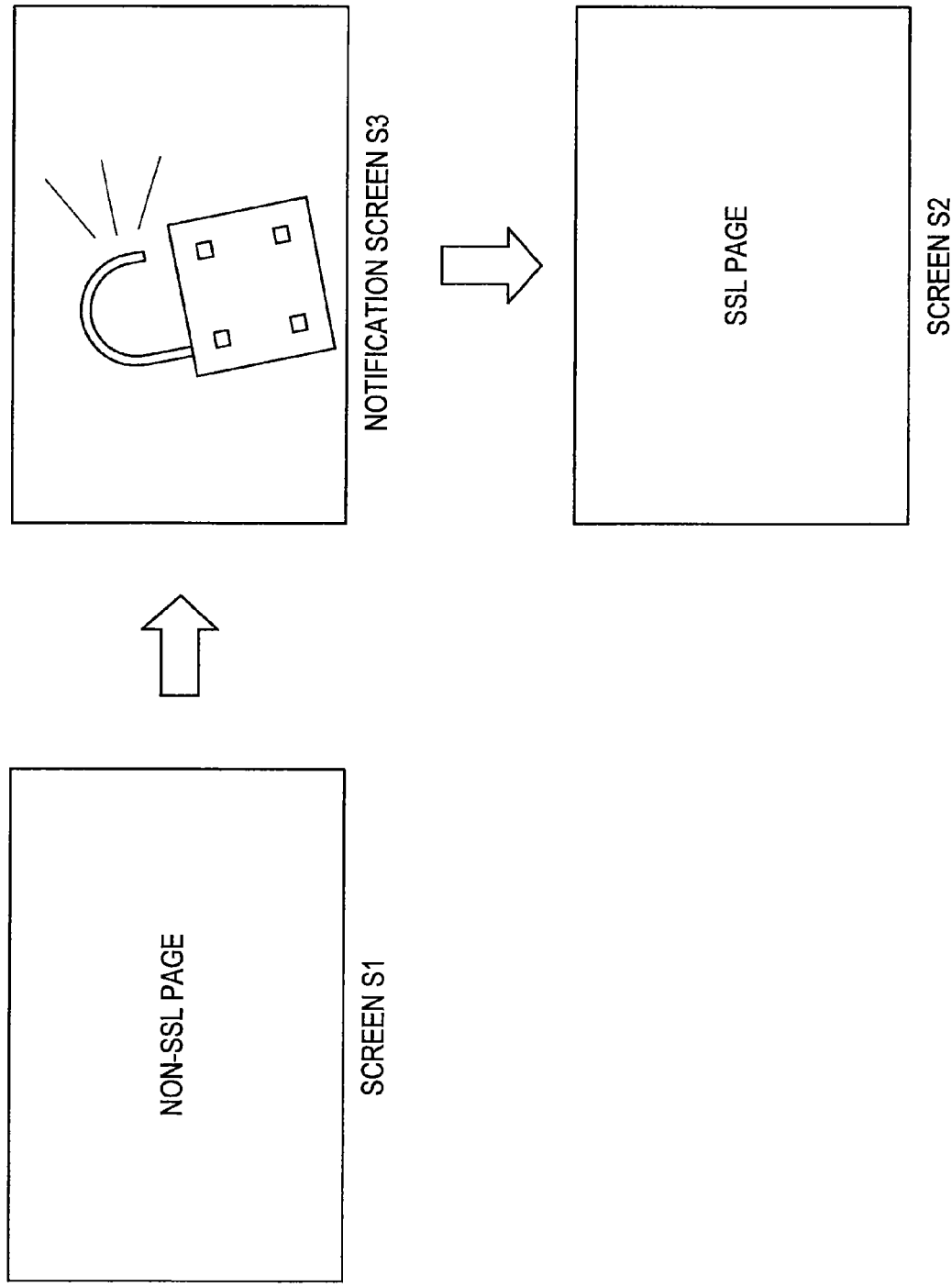
FIG. 11 is a diagram explaining an animation display example 7.

FIG. 11 is a diagram explaining an animation display example 7. This animation display example 7 represents an animation which is displayed on a notification screen S3 while a display screen is switched from a first Web page screen S1 which is not corresponding to SSL (Secure Sockets Layer) to a second Web page screen S2 which is corresponding to SSL.

In this regard, SSL is a mechanism for adding security function when data is transmitted between networks. A URL of a Web page corresponding to SSL begins with "https://", and a URL of a Web page not corresponding to SSL begins with "http://".

In the notification screen S3 of FIG. 11, for example, an animation in which a key is to be locked is displayed. Thus, a user can recognize a switching from a Web page not corresponding to SSL to a Web page corresponding to SSL. In addition, when a Web page corresponding to SSL is switched to a Web page not corresponding to SSL, an animation in which an "X" is marked on the key may be displayed on the notification screen.

4. ANIMATION DISPLAY PROCESS WHILE SWITCHING BETWEEN WEB PAGES

Figure 12:
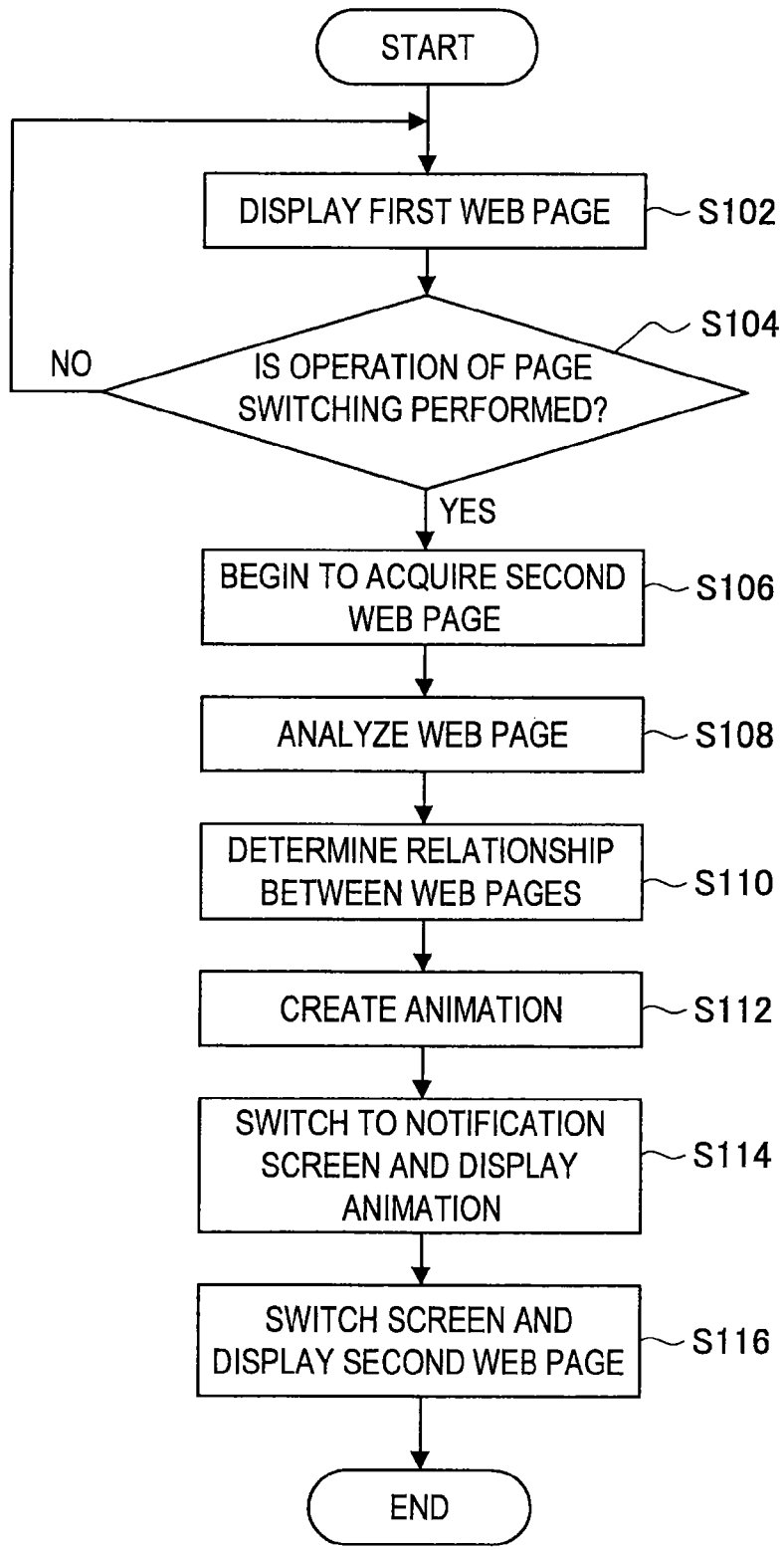
FIG. 12 is a flow chart illustrating an animation display process while switching between Web pages.

With reference to FIG. 12, an animation display process which is carried out by the user terminal 200 while switching between Web pages will be described. FIG. 12 is a flow chart illustrating an animation display process while switching between Web pages.

This process is carried out by causing a CPU of the controller 260 in the user terminal 200 to execute a program stored in ROM. The flow chart of FIG. 12 begins with acquiring a Web page (a first Web page) of the Web server 100 by the user terminal 200.

The display control unit 262 of the controller 260 causes the display unit 220 to display the first Web page acquired from the Web server 100 (step S102).

Next, the controller 260 determines whether or not a user performs an operation of page switching on the first Web page screen (step S104). For example, the controller 260 determines whether or not a Web page (a second Web page) which is a link destination of the first Web page is selected.

When it is determined that the operation of page switching is not performed in step S104 (No), the display control unit 262 causes the display unit 220 to continue displaying the first Web page. On the other hand, When it is determined that the operation of page switching is performed in step S104 (Yes), the page acquisition unit 261 begins to acquire the second Web page from the Web server 100 (step S106).

Next, the page analysis unit 263 analyzes the first Web page and the second Web page being acquired (step S108). For example, the page analysis unit 263 analyzes URL information, IP address information, meta information, and title information of the first Web page and the second Web page.

Then, the relationship determination unit 264 determines whether the first Web page and the second Web page have a relationship to each other based on a result analyzed by the page analysis unit 263 (step S110). For example, the relationship determination unit 264 determines whether or not these two Web pages are sites of the common genre.

Next, the switching information generation unit 265 creates an animation as page switching information based on a result determined by the relationship determination unit 264 (step S112). For example, when the first Web page and the second Web page are sites of the common genre (e.g., sports of tennis), the switching information generation unit 265 generates an animation (e.g., an animation representing the movement of a tennis ball) representing the common genre. On the other hand, when the first Web page and the second Web page have different genres, the switching information generation unit 265 generates animation information based on the genre information of the second Web page. Thus, it is possible to generate the optimal animation information depending on the degree of relevance between these two Web pages.

Then, the display control unit 262 switches from the screen of the display unit 220 (screen S1 displaying the first Web page) to the notification screen S3 and displays the created animation (step S114), as shown in FIG. 3 and so on. The screen is switched, and thereby the screen size of the notification screen S3 becomes larger. Therefore, the displayed animation becomes clearly visible, and thus a user can easily recognize the animation. In addition, while displaying the animation, the display control unit 262 may change the animation on the notification screen depending on the progress of switching the display from the first Web page to the second Web page. This allows a user to more easily perceive the transition state of Web pages.

Next, when the animation is finished, the display control unit 262 switches the display screen and displays the second Web page screen (screen S2) (step S116) as shown in FIG. 3 and so on. In other words, when the acquisition of data of the second Web page from the Web server 100 is completed, the animation is finished and the second Web page is displayed on the display unit 220.

According to the processes described above, an animation can be displayed on the notification screen and thus the displayed animation is noticeably visible before displaying the second Web page. For this reason, a user can recognize the content of the contents contained in the second Web page and can recognize the situation that a Web page is switching to the second Web page.

5. PAGE SWITCHING OF WEB PAGE GROUP IN TREE STRUCTURE

There is a Web page group having a hierarchical tree structure from among the Web pages displayed on the display unit 220. As an example of a Web page group, a Web page of a search engine is a top page and Web pages of lower layers have each category (e.g., tennis, finance or the like). The first Web page and the second Web page described above are also included in a Web page group having a tree structure.

Figure 13:
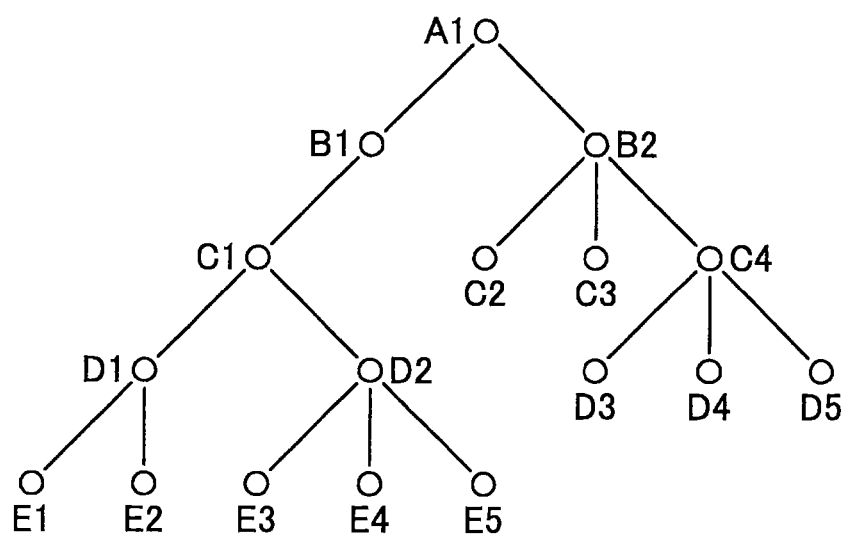
FIG. 13 is a diagram schematically illustrating a tree structure of a Web page group.

FIG. 13 is a diagram schematically illustrating a tree structure of a Web page group. In FIG. 13, Web pages are represented as a circle. In FIG. 13, a Web page A1 is a top page of the Web page group. Web pages B1 and B2 are pages having each category (e.g., news, finance) of lower layer of the Web page A1. Web pages C1 to C4 are pages of further lower layer of the Web pages B1 and B2. In this way, the Web pages A1, B1, and C1 are in the different layers.

The Web pages B1 and B2 are in the same layer. In this case, even though the sites of the Web pages are different to each other, all of them are treated as being in the same layer. In a similar manner, the Web pages C1, C2, and C3 are also in the same layer. Furthermore, for example, if a description of technology is continued from one Web page to another Web page, then the one Web page being displayed and the next Web page are both in the same layer. In this case, the domains and layers of the Web pages are all the same.

An algorithm related to the analysis and creation of the tree structure of the Web page group described above is well known in the art. For example, a directory of a search engine and ODP (Open Directory Project) are well known in the art.

Next, a page switching in the Web page group described above will be described. In the following, a page switching between Web pages in the same layer and a page switching between Web pages in the different layers will be described.

The page switching between Web pages in the same layer will be described. For a Web page group having a tree structure, it is possible to switch between Web pages with a simple flick operation on a touch panel (the input unit 210) while switching between Web pages. For example, when a Web page relevant to one of search results by a search engine is displayed, a flick operation allows a next page (a page in the same layer) to be transferred for display.

Figure 14:
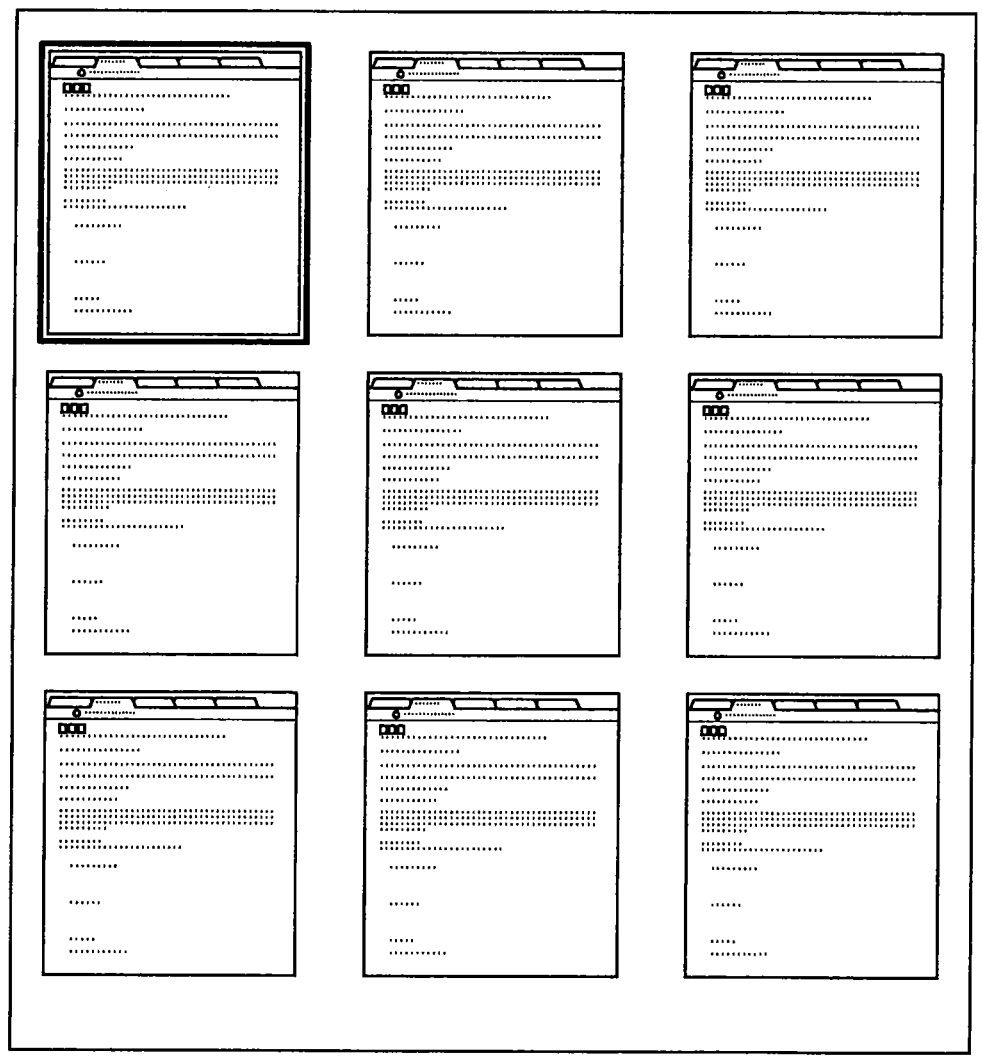
FIG. 14 illustrates Web pages in the same layer shown as thumbnails.

Furthermore, at the Web site in which the pages are numbered, it is possible to transfer a page into the next page by a flick operation. In addition, if it is necessary to transfer a page into the next page, a list of thumbnails of the Web page in the same layer is displayed as shown in FIG. 14. And then, it is possible to be switched to the selected Web page (Web page surrounded with thick border) by selecting one thumbnail in the list of thumbnails. FIG. 14 illustrates Web pages in the same layer shown as thumbnails.

The page switching between Web pages in the same layer can be performed with only a simple flick operation, and thus a user can perform the page switching without a click operation.

Next, the page switching between Web pages in the different layers will be described. The page switching between Web pages in the different layers may be performed with a pinch-in or pinch-out operation on a touch panel (the input unit 210).

Figure 15:
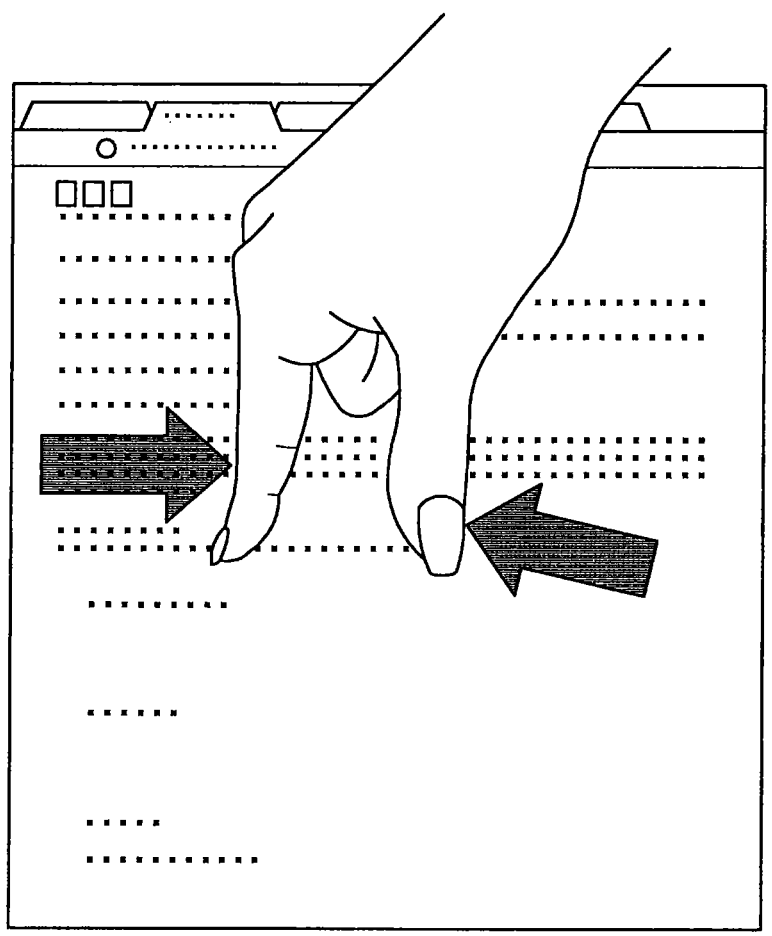
FIG. 15 is a diagram explaining a page switching by a pinch-in operation.

FIG. 15 is a diagram explaining a page switching with a pinch-in operation. For example, when a Web page referring to section m of chapter n is displayed, if a pinch-in operation as shown in FIG. 15 is performed, then a list page of sections of chapter n is displayed, and if a pinch-out operation is performed, then a list of thumbnails in the section m is displayed (see FIG. 14).

Therefore, even between Web pages in the different layers, a user can switch pages with a simple operation without a click operation.

6. CONCLUSION

The user terminal 200 of the embodiments described above, before the second Web page screen is displayed while switching between Web pages, may notify the page switching information (e.g., animation information) on the notification screen (e.g., an animation is displayed on the notification screen). By notifying the page switching information by means of the notification screen, the page switching information may be noticeably displayed. Thus, a user can easily perceive the transition state of the Web pages. In addition, a user can recognize the content of the contents contained in the second Web page which is a link destination and can recognize the relationship between the first Web page and the second Web page.

While the preferred embodiments of the present disclosure have been described above with reference to the accompanying drawings, the technical scope of the present disclosure is not limited to the above examples. Various alternations and modifications of this disclosure will become apparent to those skilled in the art within the scope and principles of this disclosure and it should be understood that they will naturally come under the technical scope of the present disclosure.

In the description of above embodiments, a moving image such as an animation is displayed on the notification screen as page switching information, but the present disclosure is not limited thereto. For example, a still image may be displayed on the notification screen.

In the description of above embodiments, the notification screen is a screen across the entire display area of the display unit 220, but the present disclosure is not limited thereto. For example, the notification screen may be a screen covering a portion of the display area of the display unit 220.

In the description of above embodiments, it has been described that the screen is switched from the notification screen and the second Web page screen is displayed, but the present disclosure is not limited thereto. For example, the second Web page may be overlapped on the notification screen. In this case, the notification screen may be displayed in a lighter color than that of the second Web page and the notification screen may be displayed as a portion of the screen of the second Web page.

Moreover, in the description of above embodiments, it has been described that the user terminal includes a display unit, but the present disclosure is not limited thereto. For example, a display unit may be provided to an external device of the user terminal. In this case, the user terminal may control the display unit of the external device.

Further, the steps described in the flow charts of the above embodiments may be performed in sequence, in parallel, or in any other time sequence, as necessary. Thus, unless otherwise stated the steps are unordered meaning that, when possible, the steps can be performed in any convenient or desirable order.

Additionally, the present disclosure may also be configured as below.

(1)

An information processing apparatus including:

a page switching unit for switching a display screen from a first Web page screen to a second Web page screen, the first Web page screen being displayed on a display unit; and a switching information notification unit for notifying a page switching information on a notification screen before the second Web page screen is displayed while switching between the pages is performed by the page switching unit, the page switching information being based on information included in at least the second Web page of the first and second Web pages, and the notification screen being a different screen from the first Web page.

(2) The information processing apparatus according to (1), wherein the switching information notification unit represents the page switching information as an animation on the notification screen.

(3) The information processing apparatus according to (2), wherein the switching information notification unit changes the animation on the notification screen depending on the progress of switching from the first Web page to the second Web page.

(4) The information processing apparatus according to any one of (1) to (3), further comprising:
an analysis unit for analyzing the first Web page and the second Web page;
a determination unit for determining a relationship between the first Web page and the second Web page based on the analyzed result by the analysis unit; and
a generation unit for generating the page switching information based on information representing a relationship between the first Web page and the second Web page when it is determined that there is the relationship between the first Web page and the second Web page,
wherein the switching information notification unit notifies the page switching information which is generated by the generation unit by displaying the page switching information on the notification screen.

(5) The information processing apparatus according to (4), wherein the generation unit generates the page switching information based on only the second Web page when it is determined that there is no relationship between the first Web page and the second Web page.

(6) The information processing apparatus according to (5), wherein the generation unit generates the page switching information based on at least one of URL information, IP address information, meta information, and title information of the second Web page.

(7) The information processing apparatus according to any one of (4) to (6), wherein the generation unit generates the page switching information when the page switching unit switches between the pages.

(8) The information processing apparatus according to any one of (4) to (6), further including:
a storage unit for storing the page switching information in advance, and
wherein the generation unit selects page switching information related to at least the second Web page of a plurality of page switching information stored in the storage unit.

(9) The information processing apparatus according to any one of (1) to (8), further including:
an audio output unit for outputting audio, and
wherein the switching information notification unit notifies the page switching information on the notification screen and causes the audio output unit to output the page switching information as audio.

(10) The information processing apparatus according to any one of (1) to (9), wherein the first Web page and the second Web page are included in a Web page group having a hierarchical tree structure,
wherein the information processing apparatus further including an input unit for receiving a flick operation, a pinch-in operation or a pinch-out operation by a user,
wherein the page switching unit switches the display screen from the first Web page screen to the second Web page screen in response to the flick operation, the pinch-in operation, or the pinch-out operation received by the input unit.

(11) An information processing method including:
switching a display screen from a first Web page screen to a second Web page screen, the first Web page screen being displayed on a display unit; and
notifying a page switching information on a notification screen before the second Web page screen is displayed while switching between the Web pages, the page switching information being based on information included in at least the second Web page of the first and second Web pages, and the notification screen being a different screen from the first Web page.

(12) A program for causing a computer to execute a process, the process including:
switching a display screen from a first Web page screen to a second Web page screen, the first Web page screen being displayed on a display unit; and
notifying a page switching information on a notification screen before the second Web page screen is displayed while switching between the Web pages, the page switching information being based on information included in at least the second Web page of the first and second Web pages, and the notification screen being a different screen from the first Web page.

The present disclosure contains subject matter related to that disclosed in Japanese Priority Patent Application JP 2011-112344 filed in the Japan Patent Office on May 19, 2011, the entire content of which is hereby incorporated by reference.

What is claimed is:
1. An information processing apparatus comprising:
one or more processors configured to:
switch a display screen from a first Web page screen of a first Web page to a second Web page screen of a second Web page, the first Web page screen being displayed on a display; and
notify page switching information on a notification screen before the second Web page screen is displayed while switching between the first Web page screen and the second Web page screen is performed, wherein the page switching information is generated corresponding to one or more pieces of information included in meta information of the second Web page,
wherein the one or more processors are configured to generate the page switching information based on only the second Web page in an event it is determined that there is no relationship between content of the first Web page and content of the second Web page.
2. The information processing apparatus according to claim 1, wherein the one or more processors are configured to represent the page switching information as an animation on the notification screen.

3. The information processing apparatus according to claim 2, wherein the one or more processors are configured to change the animation on the notification screen depending on progress of switching from the first Web page screen to the second Web page screen.

4. The information processing apparatus according to claim 1, wherein the one or more processors are further configured to:
   analyze the first Web page and the second Web page,
   determine a relationship between the content of the first Web page and the content of the second Web page based on the analysis, and
   generate the page switching information based on information representing the relationship between the first Web page and the second Web page in an event it is determined that there is the relationship between the first Web page and the second Web page, and
   notify the page switching information by displaying the page switching information on the notification screen.

5. The information processing apparatus according to claim 4, wherein the one or more processors are configured to generate the page switching information based on at least one of URL information, IP address information, the meta information, and title information of the second Web page.

6. The information processing apparatus according to claim 4, wherein the one or more processors are configured to generate the page switching information an event the one or more processors switch between the first Web page and the second Web page.

7. The information processing apparatus according to claim 4, wherein the one or more processors are further configured to:
   store the page switching information in advance, and
   select the page switching information related to at least the second Web page of a plurality of stored page switching information.

8. The information processing apparatus according to claim 4, wherein the page switching information representing the relationship between the first Web page and the second Web page is at least one of graphical, audio, or video information.

9. The information processing apparatus according to claim 1, wherein the one or more processors are further configured to:
   output audio, and
   notify the page switching information on the notification screen and output the page switching information as audio.

10. The information processing apparatus according to claim 1, wherein the first Web page and the second Web page are included in a Web page group having a hierarchical tree structure,
   wherein the one or more processors are further configured to:
   receive a flick operation, a pinch-in operation or a pinch-out operation by a user, and
   switch the display screen from the first Web page screen to the second Web page screen in response to the flick operation, the pinch-in operation, or the pinch-out operation received.

11. The information processing apparatus according to claim 1, wherein the notification screen is displayed in a color which is lighter than a color of the second Web page screen.

12. The information processing apparatus according to claim 1, wherein the page switching information is varied based on a progress of the switching of the display screen from the first Web page screen to the second Web page screen.

13. The information processing apparatus according to claim 1, wherein the page switching information is generated corresponding to a first language of the first Web page and a second language of the second Web page.

14. An information processing method comprising:
   switching a display screen from a first Web page screen of a first Web page to a second Web page screen of a second Web page, the first Web page screen being displayed on a display; and
   notifying a page switching information on a notification screen before the second Web page screen is displayed while switching between the first Web page screen and the second Web page screen, wherein the page switching information is generated corresponding to one or more pieces of information included in meta information of the second Web page,
   wherein the page switching information is generated based on only the second Web page in an event it is determined that there is no relationship between content of the first Web page and content of the second Web page.

15. A non-transitory computer-readable storage medium having stored thereon a set of computer-executable instructions for causing a computer to perform a method comprising:
   switching a display screen from a first Web page screen of a first Web page to a second Web page screen of a second Web page, the first Web page screen being displayed on a display unit; and
   notifying a page switching information on a notification screen before the second Web page screen is displayed while switching between the first Web page screen and the second Web page screen, wherein the page switching information is generated corresponding to one or more pieces of information included in meta information of the second Web page,
   wherein the page switching information is generated based on only the second Web page when it is determined that there is no relationship between content of the first Web page and content of the second Web page.

* * * * *